Dec. 3, 1946.  J. R. BENFORD  2,412,074
DEVICE FOR TESTING LIGHT POLARIZING ELEMENTS
Filed March 6, 1944   2 Sheets-Sheet 1

JAMES R. BENFORD
INVENTOR
BY
ATTORNEYS

Dec. 3, 1946.  J. R. BENFORD  2,412,074
DEVICE FOR TESTING LIGHT POLARIZING ELEMENTS
Filed March 6, 1944   2 Sheets-Sheet 2

JAMES R. BENFORD
INVENTOR
BY
ATTORNEYS

Patented Dec. 3, 1946

2,412,074

UNITED STATES PATENT OFFICE 2,412,074

DEVICE FOR TESTING LIGHT POLARIZING ELEMENTS

James R. Benford, Rochester, N. Y., assignor to Bausch & Lomb Optical Company, Rochester, N. Y., a corporation of New York Application March 6, 1944, Serial No. 525,205

7 Claims. (Cl. 88—14)

This invention relates to an apparatus for testing polarizing elements, especially laminated elements employing dichroic crystals as the polarizing agent.

The polarized transmission coefficients of light-polarizing elements comprising sheets or films formed from a set suspension of oriented polarizing particles in a transparent medium have generally been heretofore tested with a modified Martel's photometer. Certain disadvantages are inherent in the use of this equipment for unless monochromatic light is used and a spectral transmission curve determined point by point, it is necessary to match a gray with a colored field to ascertain the polarized transmission coefficients of the elements for white light. This is difficult due to the inability of the human eye to match the brightnesses of two fields whose colors are radically different. Furthermore, the performance of the testing photometer is dependent upon the assumption that the analyzing Glan-Thompson prism is perfect, an assumption which has been found not to be justified in the use of the photometer.

Any application of photoelectric devices to the problem is open to the serious objection that the spectral response of a photocell cannot be accurately matched with that of the eye. Hence, monochromatic light must be used, the transmission curve multiplied point by point throughout the spectrum by the visual response curve, and the resultant curve integrated to give the effect to the eye. This is a complicated and tedious procedure.

It is an object of the present invention to provide a simple apparatus for testing light-polarizing elements, especially of the character above described, which permits the ready and easy determination of their polarizing characteristics.

In the preferred embodiment of the invention, the apparatus comprises a plurality of aligned polarizing elements including a polarizing element used as a standard and preferably having known light-polarizing constants and a bi-partite field element producing two beams of light polarized mutually at right angles and sharply divided from each other. The standard element is mounted in a supporting structure with its plane of polarization crossed with the plane of polarization of one of the halves of the fixed bi-partite field element, the other half of the bi-partite field element then having its plane of polarization in alignment with the plane of polarization of the standard element. The element to be tested is rotatably mounted in the apparatus so that its plane of polarization is adjustable relative to the planes of polarization of the standard element and the bi-partite field element. To test the element, it is rotated until its plane of polarization is crossed with that of the half of the bi-partite element which has its plane of polarization in alignment with that of the standard element.

The apparatus may be used as a comparison device to ascertain the polarizing characteristics of the test element relative to the polarizing characteristics of the standard element by rotating the test element until its plane of polarization is crossed with the plane of polarization of the standard element. If the two halves of the field produced by the bi-partite element appear equally bright, the element under test has similar polarizing characteristics as those of the standard element. Thus the criterion of the test is whether the half field produced by the portion of the bi-partite element crossed with the test element is lighter or darker than the half field produced by the portion of the bi-partite element crossed with the standard element. Therefore, by comparing the relative intensity of the fields, the ability of the test element to satisfactorily function may be readily determined. It will be appreciated that since one is here comparing the extinction color of one polarizing element with that of a second polarizing element of the same type, the colors of the two halves of the field will be substantially the same.

The invention may also be used to determine the polarized transmission coefficient of the test element by rotating either the test element or the standard element, whichever gives the darkest field, until the light intensity of the fields is uniform. The angular displacement of the plane of polarization of the rotated element, from its crossed position with respect to the bi-partite field element, permits accurate measurement of the polarized transmission coefficient of the test element.

Other objects and advantages reside in certain novel features of construction, arrangement, and combination of parts as will hereinafter be more fully described and pointed out in the specification taken in connection with the accompanying drawings in which.

Figure 1:
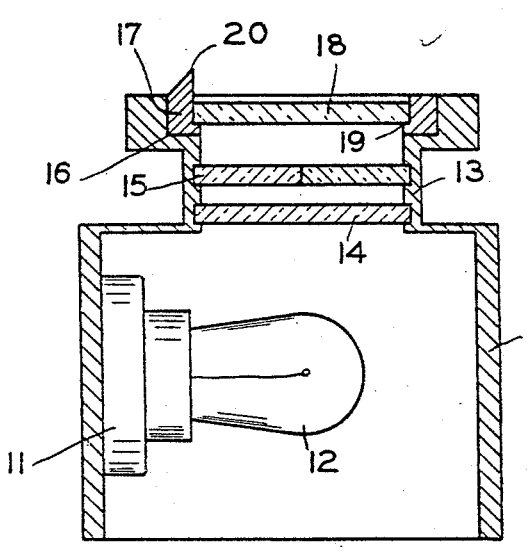
Fig. 1 is a section partly in elevation of a device embodying one form of the invention.
Figure 2:
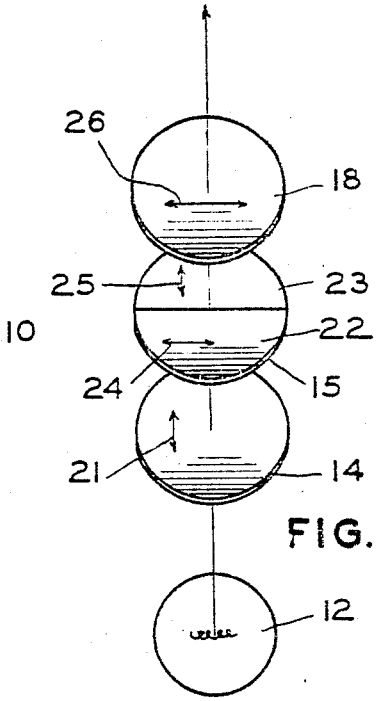
Fig. 2 is a schematic perspective view of the polarizing elements and light source shown in Fig. 1.

In the embodiment of the invention, as shown in Figs. 1 and 2, the numeral 10 designates a case having a lamp base 11 mounted on one of its inner side walls. An incandescent lamp 12 having a frosted envelope is carried by the base 11.

Extending upwardly from the horizontal top wall of the case and formed integrally therewith is a cylindrical collar 13 having a plurality of horizontal grooves in its inner circumferential surface in each of which is held a light-polarizing element 14 and 15, respectively. In the preferred form of the invention, these elements are formed from polarizing films such as "Polaroid." The top of the collar 13 has its peripheral edge formed to provide a seat and bearing member 16 for receiving a rotatable member or ring 17. The ring 17 is to carry the light-polarizing element 18 to be tested and is formed with a seat 19 for removably supporting the element to be tested. To facilitate the rotation of the ring 17, an integral projecting portion 20 of the ring 17 can be used as a handle.

The light-polarizing element 14 is so oriented that it will only pass light vibrating as indicated by the arrow 21 shown in Fig. 2. This element is used as the standard and is selected as being just passable in regard to its ability to block light vibrating perpendicular to its plane of polarization.

The element 15 comprises a polarizing element which produces two sharply divided beams of light polarized mutually at right angles and need have no particular extinction properties other than the extinction properties of the two halves 22 and 23 being equal. To effect this end the halves 22 and 23 are preferably cut from adjacent areas of the same sheet of a polarizing material, such as "Polaroid," and so assembled that one half will only transmit light vibrating in one plane and the other half light vibrating in a plane perpendicular thereto. To simplify disclosure of the present invention, the planes of polarization of polarizing elements described will be defined as transmission axes to permit their representation in the drawings as arrows. Thus the transmission axis of the part 22, represented by arrow 24, and the transmission axis of the part 23, represented by arrow 25, are perpendicular to each other.

The element 15 is mounted in the collar 13 with the part 22 having its transmission axis 24 perpendicular to the transmission axis 21 of the element 14. The transmission axis 25 of the part 23 of the element 15 will then be parallel to the transmission axis 21 of the element 14.

To test the element 18, the supporting ring 17 must be rotated in the collar 13 until the transmission axis of the element 18, represented by the arrow 26, is perpendicular to the transmission axis 25 of the part 23 of the element 15. At this time, the transmission axis 26 of the element 18 will be parallel to the transmission axis 24 of the part 22 and perpendicular to the transmission axis 21 of the element 14.

In the position of the elements noted above, light from the lamp will pass through them and issue from the test element 18 for, as is well-known, the oriented particles of these elements do not totally extinguish light when the transmission axes of the elements are crossed. As a result, a divided field of light will be seen upon examination of the test element which permits a comparison to be made between the standard element 14 and the test element 18 to determine the relative polarized light extinction properties of the element 18 with respect to those of the standard element 14.

These properties of the test element 18 may be readily determined by the relative brightness of the two halves comprising the divided field of light. If the two halves of the divided field appear equally bright, the polarized light-extinction properties of the test element 18 are just equal to those of the standard element 14. If the half of the field produced by the part 22 of the element 15 crossed with the standard element is lighter than the half field produced by the part 23 crossed with the test element 18, the test element is passed as having polarized light-extinction properties superior to those of the standard element. On the other hand, if the half of the field produced by that part of the element 15 crossed with the standard element is darker than the half of the field produced by the part of the element 15 crossed with the test element, the test element is rejected as having polarized-light extinction properties inferior to those of the standard element.

In this manner, the apparatus of the present invention may be used as a comparator in the testing of elements whose ability to satisfactorily block out polarized light may be readily determined when compared with that of a standard element having known polarized light blocking properties.

Each of the dichroic oriented crystals in polarizing films such as "Polaroid" will divide the light entering the crystal into two components polarized at right angles to each other. Due to the dichroitic nature of the crystals, absorption for one of these components will be stronger than for the other. The more freely transmitted component is the desired component and the other component, which has suffered the greatest absorption is termed the undesired component.

These components can be represented by P and $p$ wherein the desired component is the polarized amplitude transmittance P, and the undesired component is the polarized amplitude transmittance $p$. P represents the amplitude transmittance of the polarizing film for incident light which is plane polarized with its vibration direction parallel to the plane of the desired component. Similarly, the coefficient $p$ represents the amplitude transmittance of the polarizing film for incident light plane polarized with its vibration direction parallel to the plane of the undesired component. The amplitude transmittances vary in different polarizing films now available and an amplitude ratio R can be ascertained from the comparison of $p$ to P.

As some optical instruments require polarizing elements having better extinction properties than would be required in other instruments, the apparatus of the present invention may be used as a measuring instrument for determining the amplitude ratio $R_1$ of a test element.

Figure 3:
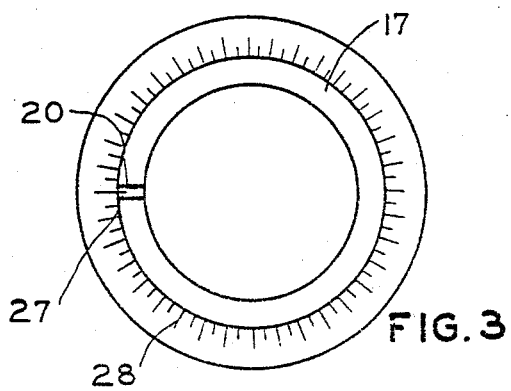
Fig. 3 is a top plan view of the device.

For this purpose, as shown in Fig. 3, the collar 13 carries a scale 28 divided into degrees and the ring 17 an index mark 27. The test element 18 is placed in the ring and adjusted until the transmission axis 26 of the same is perpendicular to the transmission axis 21 of the standard element 14.

To measure the polarized transmission coefficient of the test element 18, the ring 17 is rotated until the elements produce light fields of equal brightness. If the fields are of equal brightness in the initial setting of the test element with the transmission axis of the test element perpendicular to the transmission axis of the standard element, the amplitude ratio $R_1$ of the test element will be the same as the known ratio $R_2$ of the standard element, and the test element is just acceptable. In the event the half field produced by the portion of the bi-partite field element crossed with the test element is lighter than the half produced by the portion crossed with the standard element, then the test element is to be rejected.

It will ordinarily be necessary to rotate the ring 17 to match the fields in brightness, the amplitude ratio of the test element then being calculated by noting the angle of rotation of the test element. Knowing the rotation $\theta$ of the test element from its initial position, its amplitude ratio may be calculated from the angle $\theta$ and the known constants $P_2$ and $p_2$ of the standard element. In order to determine the amplitude ratio, $R_1$, of the test element, use may be made of the formula:

$$R_1^2 = \frac{p_1^2}{P_1^2} = \frac{p_2^2 \cos^2 \theta + P_2^2 \sin^2 \theta}{P_2^2 \cos^2 \theta + p_2^2 \sin^2 \theta}$$

In the above description, the polarized transmission coefficient of the standard "Polaroid" element 14 will have an undesired component, $p_2$, which must be measured to accurately determine the amplitude ratio of the test element. To substantially eliminate this undesired component, the standard element may be replaced by an extremely good standard polarizer, such as a Glan-Thompson prism, wherein $p_2$ is substantially zero. As a result, by eliminating this factor in the above equation, we obtain the following simplification:

$$R_1 = \frac{p_1}{P_1} = \tan \theta$$

which may be used to more readily determine the amplitude ratio of the test element. This is, of course, an approximation formula, and valid only where $p_2$ is very much smaller than $p_1$, i. e., where the standard element is much better than the test element.

In this manner, the amplitude ratio of test elements may be readily determined and graded for use in optical instruments for purposes well known in the art.

Although the position of the bi-partite field element 15 has been described as preferably being between test element 18 and the standard element 14 in both uses of the embodiment of the invention shown in Figs. 1 to 3, it will efficiently function in the apparatus even if placed in the positions of the test element 18 or standard element 14.

Figure 4:
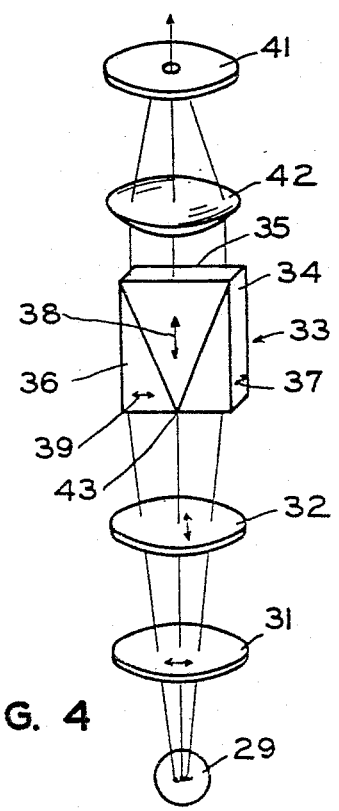
Fig. 4 is a schematic view of a modified form of the invention.
Figure 5:
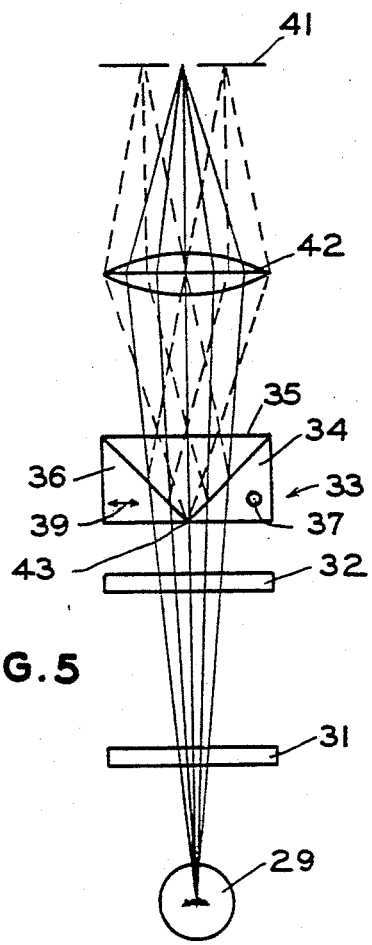
Fig. 5 is a side view of the system shown in Fig. 4, showing the path of the light through this system.

A modification of the present invention is shown in Figs. 4 and 5 wherein the numeral 29 indicates a light source from which rays of light are transmitted through a polarizing element 31 to be tested, a polarizing element 32 used as a standard and having known constants $P_2$ and $p_2$, and into a prism 33.

The prism 33 is composed of three pieces 34, 35, and 36, of an anisotropic material, generally calcite, the optic axes of which are respectively represented by arrows 37, 38, and 39, and are at right angles to each other. This prism produces a bi-partite field of light, similar to the bi-partite field of light produced by the element 15.

As shown in Fig. 5, upon incidence of a light ray upon one of the interfaces of the prism, the rays will be doubly refracted and issue therefrom as ordinary rays, indicated by solid lines, and extraordinary rays, indicated by dotted lines, which are plane-polarized in mutually perpendicular planes. The extraordinary rays are deflected by the interfaces of the prism and are absorbed by the walls of an eyepoint diaphragm 41. The ordinary rays emerge from the prism as an undeflected bundle of light, the right and left halves of which are polarized mutually at right angles, and are brought to a focus in the plane of the opening in the diaphragm 41 by the converging lens 42.

These elements of the optical system are mounted in the order and position shown in Figs. 4 and 5 with respect to their respective transmission axes, in a suitable instrument (not shown) having a rotatable member for removably mounting the test element 31, the rotatable member having a divided circle and the body of the instrument having an index mark for reading the orientation of the test element in a manner similar to the apparatus disclosed in Fig. 3.

The modified testing apparatus may then be used as a comparator or to determine the amplitude ratio of the test element 31 relative to the standard element 32 by the same methods previously described. If desired, a Glan-Thompson prism may be used as the standard polarizing element in place of the "Polaroid" element 32 to permit the use of the approximation formula:

$$R_1 = \frac{p_1}{P_1} = \tan \theta$$

in the measurement of the amplitude ratio of the test element.

In this modification of the invention just described, the sequence of the elements in the optical system comprising the polarizing elements 31, 32, and 33, may be altered within the following limitations:

1. The prism 33 must not be between the elements 31 and 32.
2. The end of the prism 33 containing the dividing edge 43 must face the elements 31 and 32.
3. The dividing edge 43 must be substantially at the focus of the lens 42 so that it will be sharply in focus to the eye.

As the respective transmission axes of the fixed standard element 32 and the test element 31 and the prism 33 are the same as previously described, the polarized light extinction properties of the test element may be easily ascertained in the use of the apparatus as a comparator. Also, upon rotation of the test element, if necessary, the polarized transmission coefficient of the test element may be readily determined to accurately define its amplitude ratio relative to the standard element 32.

Figure 6:
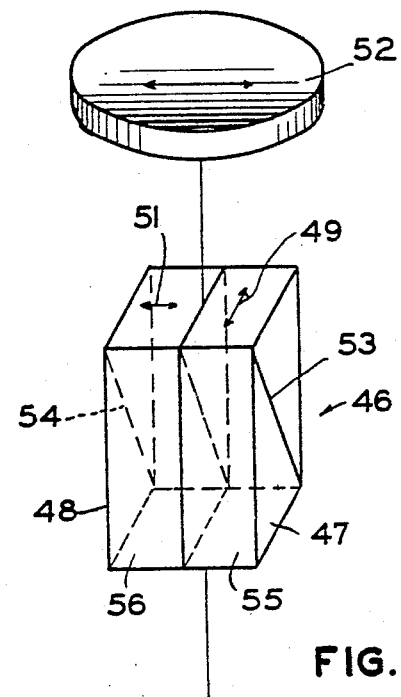
Fig. 6 is a schematic perspective view of another modified form of the invention.
Figure 7:
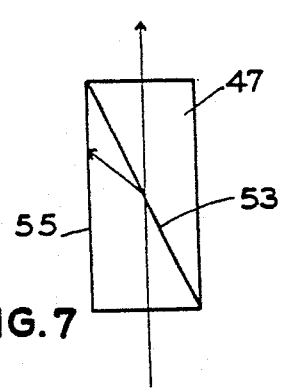
Fig. 7 is a side view of the prism shown in Fig. 6 showing the path of the rays through the same.

Referring now to Fig. 6, there is shown another modification of the present invention, wherein 44 indicates a light source from which rays of light pass through a polarizing element 45, used as a standard and having known constants $P_2$ and $p_2$, and into a polarizing element 46 formed from two polarizing prisms 47 and 48 of calcite. The optic axes of the prisms 47 and 48 are shown by arrows 49 and 51 respectively and are perpendicular to each other. Referring now to Fig. 7, the prisms 47 and 48 are so formed that they transmit only the extraordinary rays to the test element 52, the ordinary rays being totally reflected at the cemented interfaces 53 and 54 of the prisms and absorbed by the sides 55 and 56 of the prisms, the sides of the prisms being filmed with a light-absorbing material (not shown) for this purpose. As the optic axes 49 and 51 of the prisms are perpendicular to each other, the prisms will produce a bi-partite beam of light similar to that produced by the element 15. The juncture of the two prisms 47 and 48 should be clean and sharp to provide a fine and almost invisible dividing line in the beam. The formation of the prisms 47 and 48 to produce these effects is well known to those versed in the art and, therefore, no further explanation of the same is deemed necessary. It will be apparent to those skilled in the art that the prisms 47 and 48 need not necessarily be formed with their transmission axes 49 and 51 perpendicular or parallel to the sides 55 and 56. The only requisite for their proper performance in the testing system is that the respective transmission axes of the prisms be at right angles to each other.

In the operation of the testing system, the elements 45, 52, and the polarizing element 46 are mounted in the order and positions shown in Fig. 6 with respect to their respective transmission axes, in a suitable apparatus (not shown) having rotatable means removably mounting the test element 52. The rotatable member is formed with a circular scale and the body of the instrument with an index mark for reading the orientation of the test element in a manner similar to the apparatus disclosed in Fig. 3.

It will be apparent that the testing apparatus will capably function as a comparator or to determine the amplitude ratio of the test element relative to the standard element by the same methods previously described. If desired, a Glan-Thompson prism may be substituted for the standard "Polaroid" element 45 to permit a simplified calculation of the measurement of the amplitude ratio of the test element, as previously explained.

Although the position of the bi-prism 46 has been shown and described as preferably being located between the test element 52 and the standard element 45, the bi-prism may be interchanged with either of the elements provided that the respective axes of the bi-prism and the elements assume the positions relative to each other as shown in Fig. 6, and that the test element is removably mounted and freely rotatable in the apparatus.

While the polarizing elements have been described and shown as elements employing dichroic crystals as the light-polarizing agents, it is to be understood that the term polarizing element is equally applicable to the polarizing prisms illustrative of the invention and also to any light polarizing body.

From the foregoing it will be readily seen that I have provided a novel apparatus for inspecting polarizing elements, which will efficiently and easily compare the relative polarized light extinction characteristics of the test elements and also permit the ready and accurate determination of the unknown polarized transmission coefficients of polarizing elements to determine their amplitude ratios. Various modifications can be made in the apparatus of the present invention without departing from the spirit of the invention and scope of the appended claims.

I claim:

1. Apparatus for determining the light-polarizing properties of light-polarizing elements comprising a light source; a light-polarizing element having adjacent portions with mutually perpendicular planes of polarization for producing two sharply divided homogeneous beams of light polarized at right angles to each other; a light-polarizing element having known polarizing properties; means for mounting said elements in a beam of light from said source in superimposed parallel relation with the plane of polarization of the second-named element crossed with one of the planes of polarization of the first-named element; and means for removably mounting a light-polarizing element having unknown polarizing properties in substantially parallel relation to said elements and in alignment with said elements with the plane of polarization thereof crossed with the other plane of polarization of said first-named element.

2. Apparatus for determining the light-polarizing properties of light-polarizing elements comprising a light source; a light-polarizing element having adjacent portions with mutually perpendicular planes of polarization for producing two sharply divided homogeneous beams of light polarized at right angles to each other; a light-polarizing element having known polarizing properties; means for mounting said elements in the beam of light from said source in superimposed parallel relation with the plane of polarization of the second-named element crossed with one of the planes of polarization of the first-named element; means for rotatably mounting a light-polarizing element having unknown polarizing properties in alignment with said first and second-named elements with the plane of polarization thereof crossed with the other plane of polarization of said first-named element; means for rotating said third-named element relative to said first-named element and said second-named element; and means for measuring the angle of rotation of said third-named element.

3. Apparatus for determining the light-polarizing properties of light-polarizing elements comprising a light-source; a light-polarizing element having known polarizing properties; a light-polarizing prism having adjacent portions with mutually perpendicular planes of polarization for producing two sharply divided beams of light polarized at right angles to each other, said element having substantially uniform polarizing properties; means for mounting said element and said prism in superimposed parallel relation in a beam of light from said source, said prism having one of its planes of polarization crossed with the plane of polarization of said element; and means for mounting a light-polarizing element having unknown light polarizing properties in substantially parallel relation to said prism and said first-named element and in the beam of light from said light source with the plane of polarization thereof crossed with the other plane of polarization of said prism.

4. Apparatus for determining the light-polarizing properties of light-polarizing elements comprising a light source; a light-polarizing prism having adjacent portions with mutually perpendicular planes of polarization for producing two sharply divided homogeneous beams of light polarized at right angles to each other; a light-polarizing element having known polarizing properties; means for mounting said prism and said element in superimposed parallel relation in the beam of light from said source with the plane of polarization of said element crossed with one of the planes of polarization of said prism; means for rotatably mounting a light-polarizing test element having unknown polarizing properties in parallel relation to said prism and first-named element; means for rotating said test element relative to said prism and first-named element; and means for measuring the angular displacement of the test element and its plane of polarization relative to those of said prism and first-named element.

5. A device for determining polarizing characteristics of light polarizing elements comprising a light source, light polarizing means for producing two contiguous fields of polarized light with the planes of polarization of the fields mutually perpendicular, other polarizing means having known polarizing characteristics, both of said polarizing means being positioned in alignment with said source so that light rays from the source successively pass through the polarizing means, the plane of polarization of said other polarizing means being crossed with one of the planes of polarization of said first-named polarizing means, and means for removably mounting further polarizing means having unknown polarizing characteristics in operative alignment with said first-named and said other polarizing means and with its plane of polarization positioned at right angles to the other plane of polarization of the first-named polarizing means.

6. A device for testing polarizers comprising a light source, a first polarizing element having two contiguous portions for producing two adjacent fields of polarized light with the planes of polarization of the fields mutually perpendicular, said portions having substantially the same light extinction properties, a second polarizing element having known polarizing characteristics and having its plane of polarization substantially perpendicular to one of the planes of polarization of said first element, said first and second elements being in alignment with and positioned on one side of said source, and means for mounting a third polarizing element in operative alignment with said first and second elements, said third element having unknown polarizing characteristics, said means being rotatably mounted to adjustably position the plane of polarization of the third element relative to the other plane of polarization of said first element.

7. A device for testing polarizers comprising a casing having an aperture, a light source within the casing, a first polarizing element mounted in the aperture above the source, said element comprising two contiguous polarizing members having substantially equal extinction properties and having their respective planes of polarization mutually perpendicular, a second polarizing element positioned in said aperture, said second element having known polarizing characteristics and having its plane of polarization substantially perpendicular to one of the planes of polarization of said first element, and means for removably mounting a third polarizing element in said aperture.

JAMES R. BENFORD.